(12) United States Patent
Li

(10) Patent No.: US 8,670,898 B2
(45) Date of Patent: Mar. 11, 2014

(54) TIRE PRESSURE MONITORING SYSTEM AND VEHICULAR TIRE PRESSURE DEVICE THEREOF

(75) Inventor: Zhitao Li, Zhongshan (CN)

(73) Assignee: Steelmate Co., Ltd, Dongfeng Town, Guangdong Province, Zhongshan (CN)

( * ) Notice: Subject to any disclaimer, the term of this patent is extended or adjusted under 35 U.S.C. 154(b) by 154 days.

(21) Appl. No.: 13/142,331

(22) PCT Filed: May 14, 2010

(86) PCT No.: PCT/CN2010/072772
§ 371 (c)(1),
(2), (4) Date: Jun. 27, 2011

(87) PCT Pub. No.: WO2011/097845
PCT Pub. Date: Aug. 18, 2011

(65) Prior Publication Data
US 2012/0072071 A1   Mar. 22, 2012

(30) Foreign Application Priority Data
Feb. 10, 2010   (CN) .......................... 2010 1 0118574

(51) Int. Cl.
*B60C 23/04* (2006.01)
(52) U.S. Cl.
USPC .............................................. 701/36; 701/1

(58) Field of Classification Search
None
See application file for complete search history.

(56) References Cited

U.S. PATENT DOCUMENTS

| | | | | |
|---|---|---|---|---|
| 7,348,878 | B2 * | 3/2008 | Fogelstrom | 340/442 |
| 7,760,077 | B2 * | 7/2010 | Day | 340/431 |
| 7,880,595 | B2 * | 2/2011 | Shimura | 340/431 |
| 2003/0156021 | A1 * | 8/2003 | Tabata et al. | 340/442 |
| 2007/0069877 | A1 * | 3/2007 | Fogelstrom | 340/442 |
| 2007/0247105 | A1 * | 10/2007 | Krieger et al. | 320/104 |
| 2009/0045930 | A1 * | 2/2009 | Fu | 340/447 |
| 2009/0160629 | A1 * | 6/2009 | Shimura | 340/431 |
| 2011/0140876 | A1 * | 6/2011 | Deniau | 340/445 |

* cited by examiner

*Primary Examiner* — Helal A Algahaim
*Assistant Examiner* — Charles J Han

(57) ABSTRACT

A vehicular tire pressure device integrates a central monitor and signal match device of a conventional tire pressure monitoring system. The vehicular device is also combined with a power-getting interface physically. The vehicular device is also provided with a separate battery which may be rechargeable and be charged by the interface. The monitoring system and vehicular tire pressure device may be used more easily and is convenient in installation and testing and therefore, they may be accepted more easily by the user and get great commercial success.

9 Claims, 4 Drawing Sheets

TIRE PRESSURE MONITORING SYSTEM AND VEHICULAR TIRE PRESSURE DEVICE THEREOF

CROSS REFERENCE TO RELATED APPLICATIONS

The present application is a national phase entry under 35 USC §371 of International Application No. PCT/CN2010/072772, filed May 14, 2010, which claims the benefit of and priority to Chinese Patent Application No. 201010118574.0, filed Feb. 10, 2010, the entire disclosures of which are incorporated herein by reference.

FIELD OF THE INVENTION

The invention relates to an electronic security device used for a vehicle and more particularly, relates to tire pressure monitoring system and vehicular tire pressure device thereof.

BACKGROUND

Chinese patent application No. CN200910039869.6 filed on May 31, 2009 by the applicant of the present application discloses a tire pressure monitoring system and a corresponding signal match device. In this disclosure, the tire pressure monitoring system (TPMS) is divided into three modules: a central monitor installed generally inside the cab, a sensor installed inside the automobile tire; and a signal match device functioning as a learning machine between the central monitor and sensor. The detailed relationship among three modules and learning method of the signal match device has been disclosed by the above Chinese patent application and therefore, description thereof will be omitted herefrom. By the same reason, other technology around the world also employs the above construction of tire pressure monitoring system so that the three modules are utilized separately.

It is necessary and essential to provide each tire with an individual sensor. In contrast, the central monitor must be mounted in the cab due to its strong reliance on power supply. However, installation of the signal match device (also known as a learning machine) is flexible since it contains a battery and is electrically connected to both of the central monitor and sensor in a wireless manner. As such, the signal match device may be taken with the operator or even be placed into the cab, and it is used only when signal learning is needed. Compared to the signal match device using a lightweight battery, the central monitor must be electrically connected with a battery built in the vehicle so as to be supplied with power, as the monitor is often equipped with a display which always consumes large power which can't be provided by a normal power supply.

As such, before utilization, the central monitor, signal match device and sensor must be assembled together and tested. During assembling stage, supplying power to the central monitor will take much time which is difficult to be done by an amateur driver and thus, intervention of professionals is necessary. During testing stage, at first, the signal match device should be placed close to a corresponding tire and then a sensor located in the tire is actuated by pressing certain buttons such that identification information will be transmitted by the sensor and finally, certain ID information is identified and stored. After ID information of all the sensors is completely identified and stored, the signal match device is moved to a location inside the cab adjacent the central monitor. By manipulation of specific buttons the sensor ID information stored in the signal match device is delivered to the central monitor, thus finishing initial testing of the tire pressure monitoring system. It can be seen that, the above system may be distributed and sold via various distributors and product agents in theory. However, assembling and testing of the product is inconvenient and therefore, it will take much time of the user. Finally, it has direct adverse influence on potential consumers and accordingly, it makes the volume of sales reduced.

As the learning machine is designed to be separate from the central monitor and the machine is used less often, users often forget where the machine is, thereby resulting in great inconvenience.

A vehicular device connection mechanism is described in a Chinese patent application CN200910036711.3 published on Jan. 16, 2009. One end of the connection mechanism is configured to be connected with a car cigarette lighter, while the other end thereof is provided with an electronic apparatus typically a display. It can be concluded that the display of the central monitor may also be connected to the connection mechanism. This only solves the problem of supplying power to the display of the central monitor. In fact, successful application of the vehicular connection mechanism may be further illustrated through disclosure of the invention.

The connection relationship among various function modules of the tire pressure monitoring system will have influence on its application, especially on its assembling and testing stages and on its commercial success.

SUMMARY OF THE INVENTION

A primary object of the invention is to provide a tire pressure vehicular device for a tire pressure monitoring system, said device having incorporated therein kinds of function modules other than a sensor, thus making installation and use simplified.

Another object of the invention is to provide a tire pressure monitoring system optimized in construction such that installation is simple and consumers are stimulated to buy the product, thus getting commercial success.

To obtain the above objects, a vehicular tire pressure device is provided, which includes:

A power unit for supplying power to the tire pressure device independently through a battery or a power-getting interface from a car;

A control chip, which, when determining that the power unit supplies power by the battery, reads out from the high frequency signals information regarding correlation between a sensor and corresponding ID feature code and then stores the information under the control of an user manipulation; and when determining that the power unit supplies the power by the power-getting interface, reads out from the from the high frequency signals tire pressure data and ID feature code, and then outputs the ID of a corresponding sensor and corresponding tire pressure data based on the correlation;

A low frequency wake-up unit powered only by the power unit, said low frequency wake-up unit sending inducing signals of low frequency under the control of the control chip, when in the signal match device working state so that the inducing signals are sensed by the sensor and then the high frequency signals are transmitted by the sensor;

A high frequency transceiver unit for receiving said high frequency signals under the control of the control chip; and An I/O device for providing a man-machine interaction operation interface so as to receive user's operation and providing warning information.

The voltage of the battery of the power unit is different from that of the power gotten from the power-getting interface; and both the batter and power-getting interface supply power to the vehicular tire pressure device through a power control circuit.

The battery is rechargeable and is coupled with the power-getting interface via a charging circuit so as to supply power to the battery. The battery is a dry battery. The I/O device includes a touch-sensitive display. Alternatively, the I/O device includes a button, a display and speaker all of which are electrically connected to the control chip.

A tire pressure monitoring system includes a plurality of sensors installed inside respective tires of a car, and further comprising a vehicular tire pressure device according to any one of claims 1-8, wherein when the vehicular tire pressure device is powered independently by the battery and is not installed to a cigarette lighter of the car, the I/O device of the vehicular tire pressure device is operated by the user so that the low frequency wake-up circuit is triggered to transmit the inducing signals to an individual sensor; next, the sensor transmits the high frequency signals; the vehicular tire pressure device establishes correlation with the sensor based on the ID feature code contained in the high frequency signals and then the correlation data is stored; when the vehicular tire pressure device is installed to the cigarette lighter and powered by the power-getting interface, the vehicular tire pressure device receives the high frequency signals from respective sensors through its high frequency transceiver unit; and finally, the vehicular tire pressure device outputs through its I/O device the sensor data and corresponding tire pressure data based on tire pressure data and ID feature code included in the high frequency signals and by comparison with the correction data.

A tire pressure monitoring system includes a central monitor, a signal match device and at least a sensor, wherein the central monitor and signal match device are assembled with each other to form a vehicular tire pressure device, said vehicular tire pressure device being provided with a power-getting interface for supplying power to the central monitor when the interface is connected to a car cigarette lighter, said signal match device being provided with a battery to supply power to said the signal match device.

Compared with conventional technology, the invention has the following advantages.

At first, in the invention, a central monitor and signal match device of a conventional tire pressure monitoring system are combined together, and the combined component is connected to a power-getting interface so as to form an independent device. As the combined component is able to connected to or disconnected from a car cigarette lighter, it is unnecessary to get power by retrofitting of instrument panel of the car. Instead, power with voltage of 12 volt (for example) is supplied by the interface and accordingly, installation and testing of the monitoring system will take less time.

Secondly, as the function of a conventional central monitor and signal match device is realized in the vehicular tire pressure device, the total cost of the tire pressure monitoring system is significantly reduced.

Lastly, installation and removal of the vehicular tire pressure device of the invention is done by simple and quick insertion and disconnection. As a result, substantial convenience for the user in terms of installation and testing is brought, and it also leads to great commercial success.

Other advantages and novel features will be drawn from the following detailed description of embodiments with attached drawings, in which:

DETAILED DESCRIPTION

The invention is now described in great detail in conjunction to accompanying drawings and various embodiments.

The tire pressure monitoring system of the invention is improved upon a prior art system consisting of a signal match device, a central monitor and a plurality of sensors. A typical prior art system is disclosed for example in Chinese patent application CN200910039869.6 and Chinese patent CN101241633A. The latter discloses a system device capable of setting, transmitting, receiving and storing data of a wireless electronic sensor, said system device in fact being covered by the monitoring system of the invention. By the same token, reference may be made to Chinese patent CN1994765A disclosing a tire pressure measuring system. All of the three references disclose a tire pressure monitoring system constructed of above three functional modules, though these monitoring systems may be implemented by different circuitry. The monitoring system of the present invention is also made of the above three functional modules without exception.

The invention is discussed with two embodiments sharing the same invention concept. In these embodiments, the signal match device and central monitor are generalized as a vehicular tire pressure device which constitutes together with several sensors the tire pressure monitoring system of the invention. It is noted that the vehicular tire pressure device of the invention may be realized by assembling physically the central monitor and signal match device together. Alternatively, the monitor and signal match device may also be connected with each other electronically. The two embodiments described above illustrate with great detail the principle of invention of tire pressure monitoring system and vehicular tire pressure device thereof.

Figure 1:
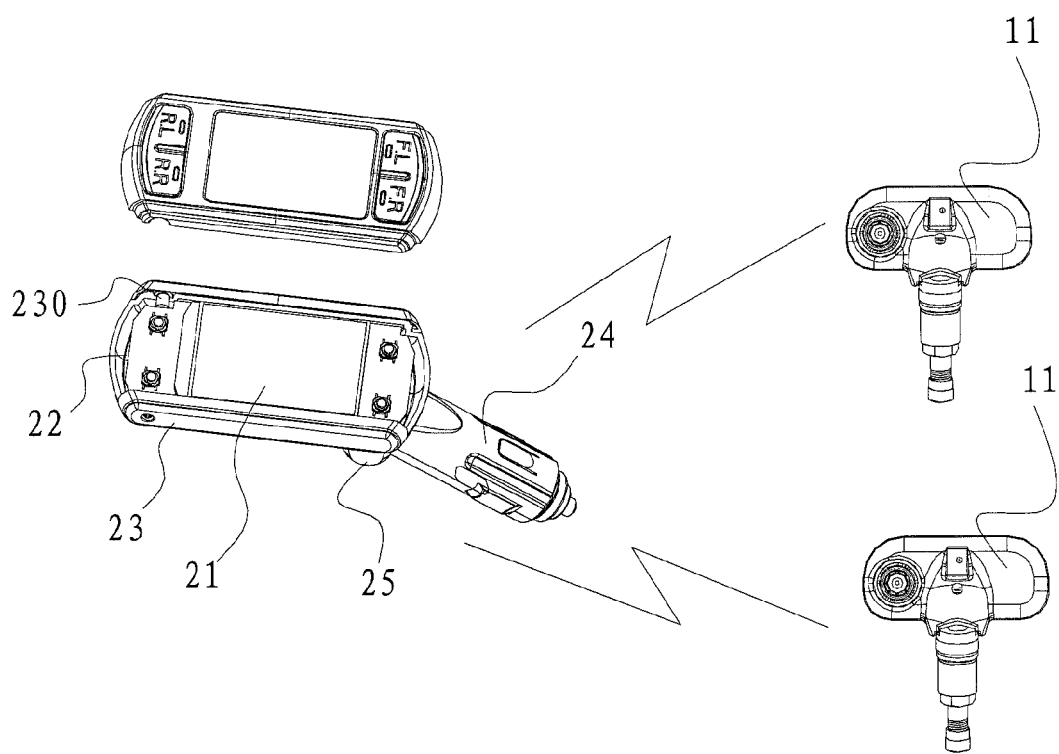
FIG. 1 shows a construction of a tire pressure monitoring system according to the invention, in which a box of a tire pressure vehicular device is opened and no sensor is located inside the tire.

With reference to FIG. 1 and according to a first embodiment of the invention, the tire pressure monitoring system includes several sensors 11 installed inside corresponding tires of a vehicle and a vehicular tire pressure device 2 connected with a cigarette lighter located inside the cab. The vehicular tire pressure device 2 includes a central monitor 21, a signal match device 22, a box 23 for receiving the monitor 21 and signal match device 22 therein, and a power-getting interface 24 for getting power from the cigarette lighter of the cab.

Figure 2:
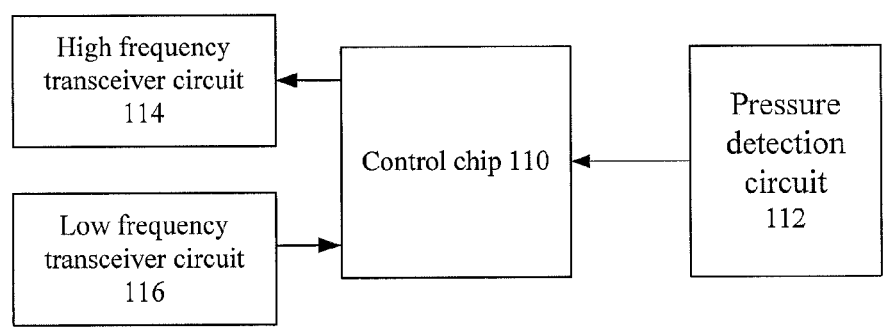
FIG. 2 shows a circuit diagram of a prior art sensor circuitry which may be cooperative with the tire pressure monitoring system of the invention.

With reference to FIG. 2, each sensor 11 is used for sensing tire pressure inside the tire. It is known that the sensor 11 commonly contains a control chip 110, a pressure detection circuit 112, a high frequency transceiver circuit 114 and a low frequency transceiver circuit 116. The tire pressure is detected firstly by the pressure detection circuit 112 and then is transmitted as electrical signal to the control chip 110. The control chip 110 controls the electrical signal to be transmitted to the outside space through the high frequency transceiver circuit 114. The central monitor 21 or similar control logic in the vehicular tire pressure device 2 receives the electrical signal. After that, the signal of high frequency containing tire pressure data and ID feature code of the tire is further processed by the central monitor 21. The sensor 11 may determine whether the tire pressure is larger than a predefined value and then, the determination result is sent in a wireless manner to the central monitor 21. Alternatively, the central monitor 21 of the vehicular tire pressure device 2 may also make such determination as to whether the tire pressure is beyond the predefined threshold value. The low frequency circuit 116 of the sensor 11 has the function of receiving low frequency inducing signals generated by operation of the signal match device 22 of the vehicular tire pressure device 2 by the user. Then, the inducing signals are processed by the control chip 110. Specifically, the control chip 110 generates a signal containing ID feature code of the sensor 11 according to the low frequency inducing signals and then, the signal generated by the chip 110 is sent out through the high frequency transceiver circuit. Next, the signal is stored in the signal match device 22 of the vehicular tire pressure device 2 so as to be provided to the monitor 21. The signals generated by the sensor are sent by the high frequency transceiver circuit 114, and these signals normally contain ID feature code of the sensor 11 and current tire pressure of the present tire.

With reference to FIGS. 1 and 2, in this embodiment, the monitor 21 and signal match device 22 inside the vehicular tire pressure device 2 are separate from each other in logic, and they are held physically into the box 23. As a result, after the high frequency signals containing ID feature code are gotten by the signal match device 22, user instructions (may be produced by pressing a button by the user) must also be received so as to transmit the electrical signals containing ID feature codes of respective sensors 11 to the central monitor 21.

Figure 3:
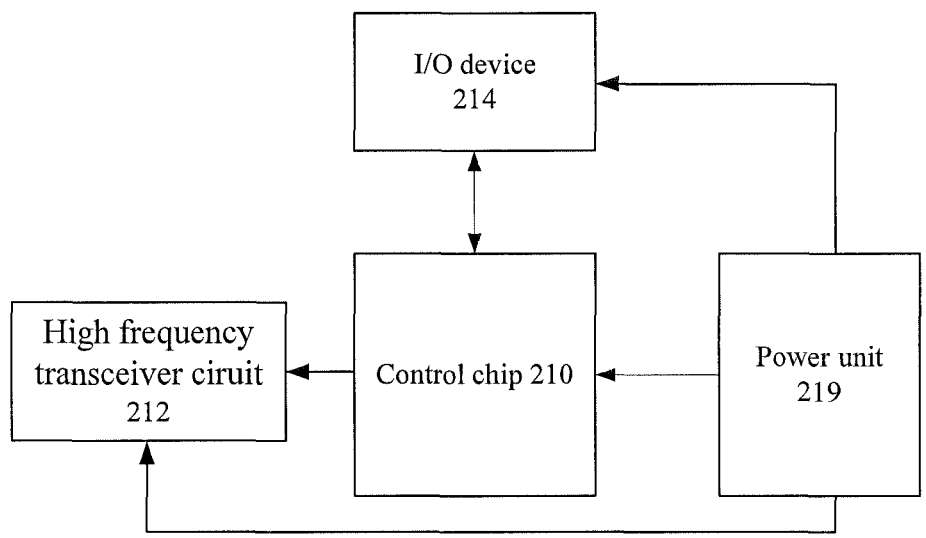
FIG. 3 shows a circuit diagram of a central monitor according to a first embodiment of the invention.

Referring to FIG. 3, the central monitor 21 of the device 2 includes at least the following components: a high frequency transceiver circuit 212, a control chip 210, an I/O device 214 and a power unit 219. The control logic function is implemented by the control chip 210; the I/O device 214 contains input and output devices. For example, the input device may be realized as a keyboard, while the output device may be realized as a display, speaker and so on. In this embodiment, the I/O device is an entire device and preferably realized by a touch-sensitive display. The use may conduct any setting by inputting parameters through the I/O device. The input instructions of the user may be received and performed by the control chip 210. The high frequency transceiver circuit 212 serves to receive high frequency signals including ID feature codes and tire pressure data sent from respective sensors 11. The control chip 210 further processes the high frequency signals including ID feature codes and tire pressure data and then the these signals are output by the I/O device 214 such that tire pressure data of each sensor 11 is shown clearly to the user. For example, the tire pressure data may be shown on a display or delivered to the user as audible alarm signal. The high frequency transceiver circuit 212 may also receive high frequency signals including ID feature codes from the signal match device 22 and then transmit the signals to the control chip 210. These signals are identified by the control chip 210.

Next, the location data of each sensor 11 is identified, labeled, and stored by the central monitor 21. By this manner, correlation between location of each sensor 11 and ID feature code thereof is established. Therefore, after the central monitor 21 received high frequency signals containing tire pressure data and ID feature code of each sensor 11, the control chip 210 thereof is able to look up the correlation data previously stored and compare it with the data newly received so that the driver will be able to know the tire pressure of all tires of the vehicle. The method of establishing the correlation therebetween is well known in the art and therefore, description thereof is omitted.

Figure 4:
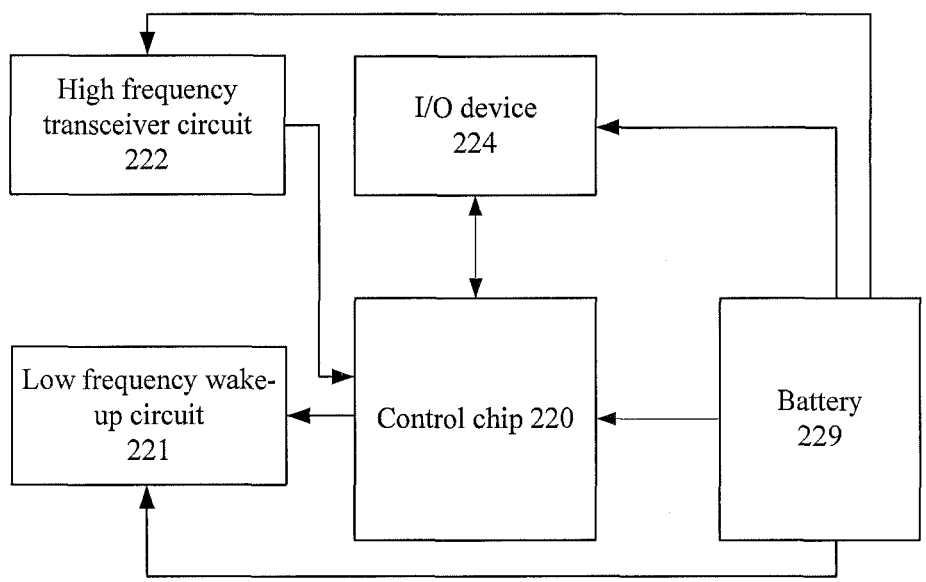
FIG. 4 shows a circuit diagram of a signal match according to a first embodiment of the invention.

Reference is made to FIG. 4. The signal match device 22 of the vehicular tire pressure device includes at least a control chip 220, a low frequency wake-up circuit 221, a high frequency transceiver circuit 222 and an I/O device 224 (alternatively, an input device is sufficient). An individual battery 229 is provided to supply power to the control chip 220, low frequency wake-up circuit 221, high frequency transceiver circuit 222 and the I/O device 224. Signal match is realized easily. In a typical example, the signal match device 22 is placed by the user in a location close to a tire equipped with a sensor 11. A certain button (not shown) of the I/O device 224 is pressed such that the control chip 220 can recognize this pressing action and then generate an inducing signal which is then transmitted as low frequency signal to the low frequency transceiver circuit 116 of the sensor 11 through the low frequency wake-up circuit 221. Based on these low frequency signals, the control chip 110 of the sensor 116 transmits high frequency signals including ID feature code by its high frequency transceiver circuit 114. The high frequency signals including ID feature code are received by the high frequency transceiver circuit 222 of the signal match device 22 and then stored in memory corresponding to the button pressed. In such manner, the signal match device 22 is controlled to transfer ID feature codes of each sensor 11 to the central monitor 21. As described above, the signal match device 22 is also well known in the art and therefore, description thereof is also omitted herefrom.

After received the ID feature code of the sensor 11, the signal match device 22 recognizes the code and stores the code. When the code is transmitted to the central monitor 21, the monitor 21 will also recognize the code and output the tire pressure data related to the code to the user. The above recognition and storing process are also well known in the art and accordingly, description thereof is also omitted.

It should be emphasized once again that in the present embodiment, the above description regarding construction of the monitor 21 and signal match device 22 of the device 2 and electrical connection therebetween are only illustrative and are not intended to limit the invention to these particular implementations. In other words, structure and electrical connection of the central monitor 21 and signal match device 22 may be designed with certain freedom. For example, the monitor 21 and signal match device 22 may take any form as long as they belong to a tire pressure monitoring system which contains three functional modules.

Figure 5:
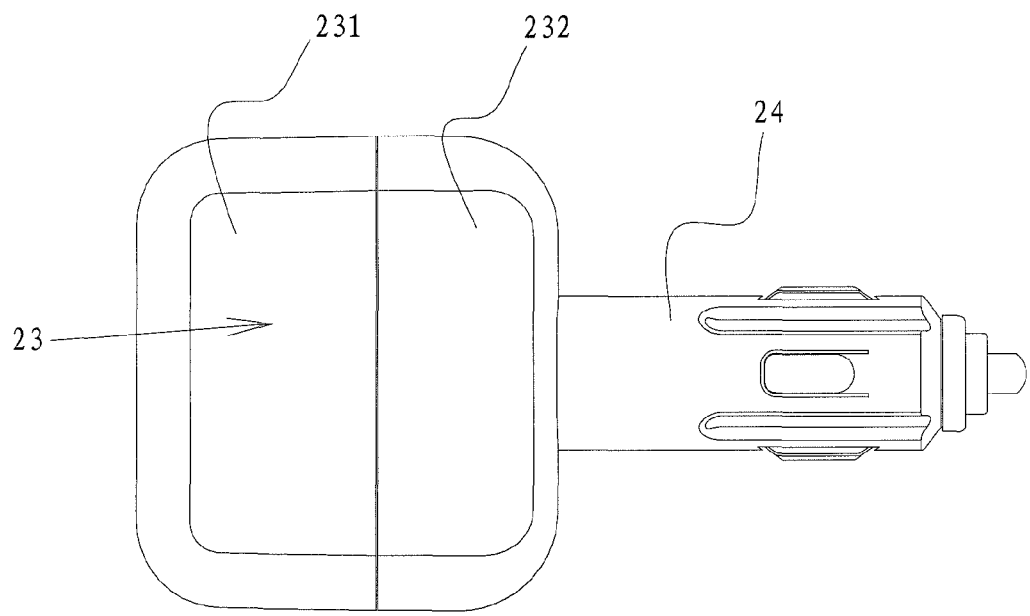
FIG. 5 shows structure of a vehicular tire pressure device according to an embodiment of the invention.

With reference to FIGS. 1 and 5, the box 23 is an enclosure which may take the form as shown in FIG. 1 or FIG. 5. The box 23 functions to assemble the central monitor 21 and signal match device 22 together physically. For example, the monitor 21 may be mounted on one side of the box 23, while the signal match device 22 may be mounted on the other side thereof. The box 23 includes two opposite groove elements 231 and 232 which are clasped with each other. Also included is a frame 230 for securing the monitor 21 and signal match device 22. It is noted that the box 23 may be designed to have any form.

Referring to FIGS. 1 and 5, the cigarette lighter power-getting interface 24 is the same as that of the vehicular device connection construction disclosed in Chinese patent application CN 200910036711.3. The power-getting interface 24 is connected to the box 24 through said connection construction such that a pivotal construction 25 is formed to adjust the angle of the box 23. As such, the power-getting interface 24 may be connected with the cigarette lighter mounted inside the vehicle cab to get the electric power with voltage of 12V (which may vary depends upon configuration of a specific vehicle). The power is supplied to the central monitor 21 in the box 23 via a predefined wire layout (not shown) disposed in the box 23. The central monitor 21 is provided with a touch-sensitive display as its input device which is disposed on one side of the box 23. Accordingly, the side on which the display is mounted, of the box 23, is designed to be transparent so that the display will be seen by the user. Similarly, other output device may also be equipped to the central monitor 21, for example a speaker, a vibration circuit and the like.

It is noted that the sensor 11 is induced by the signal match device 22 of the vehicular tire pressure device 2 to transmit inducing signals of low frequency. It is known that low frequency signal has limited transmission distance and therefore, it is necessary to place the device 2 near the corresponding tire to realize reliable signal transmission. Considering this limitation and as described above, a dedicated battery 229 is disposed in the box 23 of the device 2 so as to supply power to the signal match device 22. The battery 229 may be a dry battery or rechargeable battery. When it is a rechargeable battery, the battery 223 may be connected to the power-getting interface 24 so that the battery 223 may be recharged when its electric energy is low. A charging circuit 20 (referring to FIG. 6) may be connected between the battery 229 and power-getting interface 24, and the circuit 20 may take any form known in the art of electrics.

Figure 6:
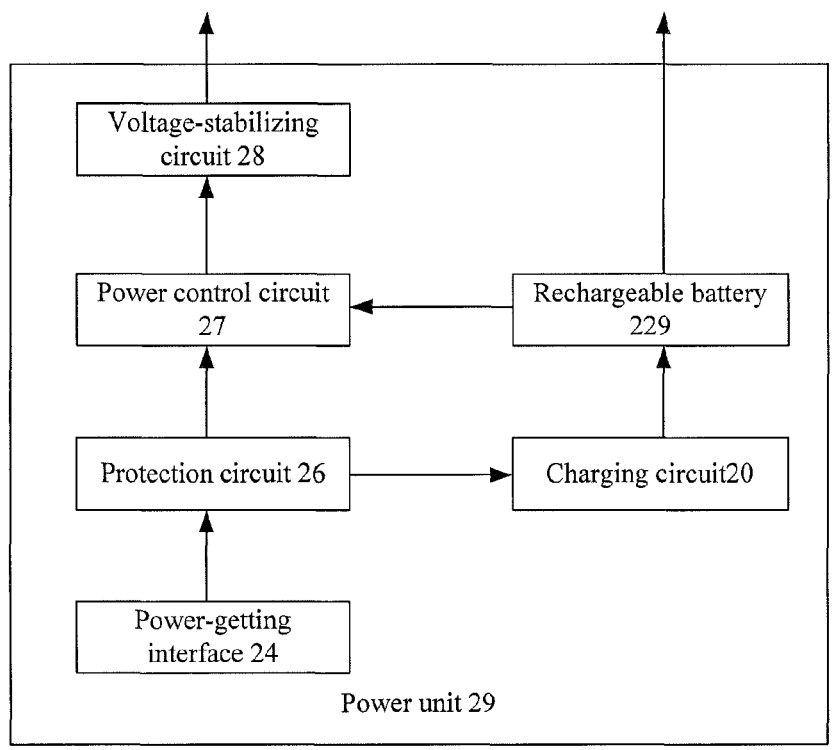
FIG. 6 illustrates a circuit diagram of a power unit of the vehicular tire pressure device of the invention.
Figure 7:
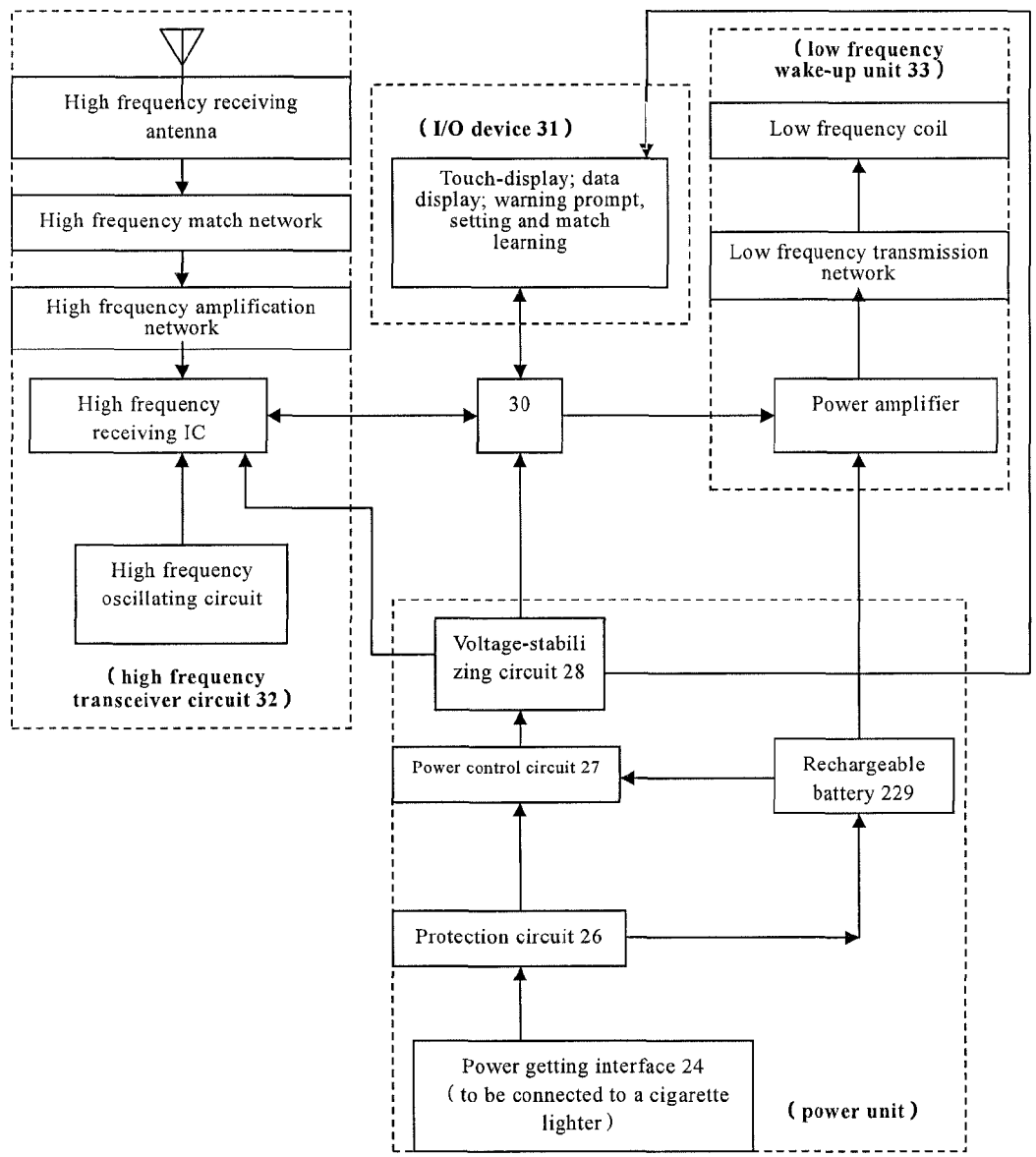
FIG. 7 depicts a circuit diagram of the vehicular tire pressure device according to another embodiment of the invention.

To make improvement to power supply performance of the vehicular tire pressure device 2 constructed of the signal match device 22 and central monitor 21, reference is made to FIG. 6 which shows an improved power unit 29. As shown in this figure, the power unit 29 is consisted of the power-getting interface 24, a protection circuit 26, a power control circuit 27, a voltage-stabilizing circuit 28 and a rechargeable battery 229. The power-getting interface 24 is electrically connected to the protection circuit 26 which together with the charging circuit 229 is further connected electrically to the power control circuit 27. The power control circuit 27 is further coupled with the voltage-stabilizing circuit 28 electrically. In addition, the charging circuit 229 is also connected via the charging circuit 20 to the protection circuit 26 so as to charge the battery. In fact, the power unit 29 may be embodied in many forms and is not limited to the form described above. Moreover, the power unit 29 of this embodiment may also be applied to other embodiment of the invention.

When the vehicular tire pressure device 2 is inserted into the cigarette lighter of the vehicle, the power control circuit 27 of the power unit 29 will control the power-getting interface 24 so that it will supply power to the central monitor 21. In this case, the central monitor 21 works, while the signal match device 22 is necessary to work now. Accordingly, the rechargeable battery 229 is blocked by the power control circuit 27 such that no power will be supplied. By the same reason, when the device 2 is disconnected from the cigarette lighter of the vehicle, the power control circuit 27 will control automatically the rechargeable battery 229 so that power is provided to the signal match device 22 and in turn, the signal match device 2 will enter into working state. It is noted that in this case, the low frequency wake-up circuit 221 will also be activated. The low frequency wake-up circuit 221 is powered directly by the rechargeable battery 229 without intervention of the voltage-stabilizing circuit 28. Of course, the circuit 221 may also be powered with intervention of the circuit 28. In addition, the power control circuit 27 may be realized easily. For example, it may be realized by a normal circuit or logic control electronics as known by a person of ordinarily skilled in the art. In the invention, as there is voltage difference between the power source of the cigarette lighter and battery 29, it can be easily realized. In an embodiment (not shown) of the invention, the power control circuit 27 is directly electrically connected with the control chip 30. Therefore, the power control circuit 27 is controlled and driven by the control chip 30 so as to supply power to the battery and chare the same battery.

It is therefore, in the present embodiment, the central monitor 21 to and signal match device 22 are physically contained in the box 23, and then combined with the power-getting interface 24 so as to form the vehicular tire pressure device 2. The central monitor 21 is powered by the power-getting interface 24, while the signal match device 22 is powered directly and separately by the battery 229. In addition, when the battery 229 is rechargeable, it can be charged by the power-getting interface 24. It is not easy for the signal match device 22 to be lost. When the vehicular tire pressure device 2 is inserted into the cigarette lighter inside the car cab, the tire pressure of all tires may be functionally detected. When it is desired to determine the location of the sensors and adjust displaying effect of the tire pressure data, the device 2 may be removed from the cigarette lighter and be located close to each tire in order. The above determination and adjustment process is simple and convenient and accordingly, a tire pressure monitoring system employing the vehicular tire pressure device 2 of the invention is clearly more acceptable by the user.

In a further embodiment of the invention, the tire pressure monitoring system of the invention is further optimized so as to get more advantage in cost.

With reference to FIGS. 1, 2, 5 and 7, the tire pressure monitoring system of this embodiment includes a vehicular tire pressure device 2 and a sensor 11. The sensor 11 has the same construction and electrical principle as the previous embodiment. Differently in this embodiment, the vehicular tire pressure device 2 is constructed of control logic which has the same function as the combination of the central monitor 21 and signal match device 22 (FIGS. 3 and 4) of the previous embodiment. In other words, the central monitor 21 and signal match device 22 illustrated in previous embodiment have been integrated as an entirety, thus forming the vehicular tire pressure device 2 of the present embodiment.

The vehicular tire pressure device 2 of the present embodiment includes a control chip 30, an I/O unit 31, a high frequency transceiver unit 32, a low frequency wake-up unit 33 and a power unit 29. The I/O unit 31, a high frequency transceiver unit 32, a low frequency wake-up unit 33 and a power unit 29 are all electrically connected to the control chip 30.

As mentioned above, the power unit 29 of an earlier embodiment of the invention (see FIG. 6) is also adapted to the present embodiment. In present embodiment, the power unit 29 includes a power-getting interface 24 which has the same structure and electrical principle as the earlier embodiment. This interface 24 may be connected to the cigarette lighter of the cab so as to indirectly get power from the engine of the car. Alternatively speaking, when the interface 24 is inserted into the cigarette lighter of the car, it can supply power to the equipment coupled therewith. When the protection circuit 26 of the power unit 29 is activated, the high frequency transceiver circuit 32, I/O unit 31 and control chip 30 will be powered by the power unit 29 through the power control circuit 27 and in turn the voltage-stabilizing circuit 28. A rechargeable battery 229 is provided and is configured to electrically coupled with the power control circuit 27 so that power will be continuously supplied even the vehicular tire pressure device 2 is removed from the lighter. The battery 229 is also separately connected electrically with the low frequency wake-up circuit 33 to provide power to it. The power control circuit 27 is also electrically connected to the rechargeable battery 229, in addition to the power-getting interface 24 through the protection circuit 26. By this way, the power control circuit 27 is able to switch between different power-support modes (this kind of switch may also be implemented in another embodiment by a control chip); that is, select whether power should be obtained from power-getting interface 24 or from the rechargeable battery 229. As a result, the control chip 30 can switch easily. It can be seen that in this embodiment, the power unit 29 has the same construction as the previous embodiment.

The control chip 30 contains the function of the central monitor 21 and signal match device 22 of the previous embodiment and is realized by programming. The working state of the control chip 30, that is, the working state of the both central monitor 21 and signal match device 22, may be set by detection of the power-support mode of the power unit 29. The voltage-stabilizing circuit 28 is indispensable no matter the control chip 30 is powered by the power-getting interface 24 or by the rechargeable battery 229. In addition, voltage of the power-getting interface is usually 12 volt, while voltage of the battery 229 is 3.6 volt. As such, the control chip 30 may also determine the current power-support mode and then enter into corresponding working state by measurement of the current voltage. When the device 2 is inserted into the cigarette lighter, the control chip 30 functions as the central monitor and performs the program logic of the monitor. In this case, the function of the monitor 21 of the previous embodiment may be arrived at by the high frequency transceiver circuit 32 and I/O device 31. When the high frequency transceiver circuit 32 receives from the sensor 11 high frequency signals containing tire pressure data and ID feature code, the location of the sensor 11 and tire pressure data of corresponding tire may be output based on the information stored on the memory unit (not shown) of the control chip regarding ID feature code and location (the location may be represented by certain type of data and be recognized by a program) of corresponding sensor 11. When the vehicular tire pressure device 2 is disconnected from the cigarette lighter, the control chip 30 will perform the function of the signal match device 22. In this case, the function of the device 22 of the previous embodiment may be achieved by the high frequency transceiver circuit 32, I/O device 3 and low frequency wake-up circuit 33. Namely, the signals containing ID feature code coming from a sensor 11 are analyzed by the control chip 30 and then, correlation between the ID feature code and location of the sensor is established, thus finishing identification of the corresponding sensor 11. In addition, the correlation data is stored in the memory unit (not shown) of the control chip 30 for future use by the central monitor 21.

Apparently, the high frequency transceiver circuit 32 serves as the high frequency transceiver circuit 212 of the central monitor 21 and high frequency transceiver circuit 222 of the signal match device 22 of the previous embodiment at the same time. The control chip 30 determines when the high frequency transceiver circuit 32 is used as the circuit 212 or circuit 222. By the same reason, the low frequency wake-up circuit 33 in fact also functions as the low frequency wake-up circuit 221 of the signal match device 22 of the previous embodiment, and is also scheduled by the control chip 30.

The I/O device 31 may also have the same construction and function as that described in previous embodiment. For example, as aforementioned, a touch-sensitive display may be used and electrically connected with the control chip 30. Alternatively, it may also be implemented by the combination of a keyboard, display and a speaker.

Compared to the previous embodiment, in this embodiment, the central monitor 21, signal match device 22 and power-getting interface 24 are assembled together. In addition, the present embodiment further simplifies the electrical construction. In other words, the I/O device 31, high frequency transceiver circuit 32 and control chip are shared by the central monitor 21 and interface 24, thus leading to significant cost saving.

Similar to the previous embodiment, in this embodiment, the vehicular tire pressure device 2 may also be assembled via the box 23 and so on.

In summary, the two preferred embodiments of the invention both realize optimization of a conventional tire pressure monitoring system. Specifically, the central monitor together with the signal match device is effectively combined with the power-getting interface, thereby leading to the tire pressure monitoring system of the invention. Physical construction and operating logic of the central monitor, the signal match device and the power-getting interface is well known in the art. Moreover, a person of ordinarily skilled in the art also has the knowledge of the power-getting interface and box for installation of the monitor and signal match device therein. The distinct feature of the invention lies in flexible combination of the above three components and, this kind of combination brings substantial convenience for the user in terms of installation and testing, and also leads to great commercial success.

What is claimed is:

1. A vehicular tire pressure device receiving from at least one sensor of a tire pressure monitoring system high frequency signals, comprising:

a power unit for supplying power to the tire pressure device independently through a battery or a power-getting interface from a car;

a control chip, which, when determining that the power unit supplies power by the battery, reads out from the high frequency signals information regarding correlation between a sensor and corresponding ID feature code and then stores the information under the control of an user manipulation; and when determining that the power unit supplies the power by the power-getting interface, reads out from the from the high frequency signals tire pressure data and ID feature code, and then outputs the ID of a corresponding sensor and corresponding tire pressure data based on the correlation;

a low frequency wake-up unit powered only by the power unit, said low frequency wake-up unit sending inducing signals of low frequency under the control of the control chip, when in the signal match device working state so that the inducing signals are sensed by the sensor and then the high frequency signals are transmitted by the sensor;

a high frequency transceiver unit for receiving said high frequency signals under the control of the control chip; and an I/O device for providing a man-machine interaction operation interface so as to receive user's operation and providing warning information.

2. The vehicular tire pressure device according to claim 1, wherein the voltage of the battery of the power unit is different from that of the power gotten from the power-getting interface; and both the batter and power-getting interface supply power to the vehicular tire pressure device through a power control circuit.

3. The vehicular tire pressure device according to claim 1, wherein the battery is rechargeable and is coupled with the power-getting interface via a charging circuit so as to supply power to the battery.

4. The vehicular tire pressure device according to claim 1, wherein the battery is a dry battery.

5. The vehicular tire pressure device according to claim 1, wherein the I/O device includes a touch-sensitive display.

6. The vehicular tire pressure device according to claim 1, wherein the I/O device includes a button, a display and speaker all of which are electrically connected to the control chip.

7. The vehicular tire pressure device according to claim 1, wherein the power-getting interface is located outside of the vehicular tire pressure device, and the other components of the vehicular tire pressure device are all assembled into a box.

8. The vehicular tire pressure device according to claim 7, wherein a pivotal connection construction is disposed between the power-getting interface and box.

9. A tire pressure monitoring system, comprising a plurality of sensors installed inside respective tires of a car, and further comprising a vehicular tire pressure device according to claim 1, wherein when the vehicular tire pressure device is powered independently by the battery and is not installed to a cigarette lighter of the car, the I/O device of the vehicular tire pressure device is operated by the user so that the low frequency wake-up circuit is triggered to transmit the inducing signals to an individual sensor; next, the sensor transmits the high frequency signals; the vehicular tire pressure device establishes correlation with the sensor based on the ID feature code contained in the high frequency signals and then the correlation data is stored; when the vehicular tire pressure device is installed to the cigarette lighter and powered by the power-getting interface, the vehicular tire pressure device receives the high frequency signals from respective sensors through its high frequency transceiver unit; and finally, the vehicular tire pressure device outputs through its I/O device the sensor data and corresponding tire pressure data based on tire pressure data and ID feature code included in the high frequency signals and by comparison with the correction data.

\* \* \* \* \*